United States Patent
Thomas

(10) Patent No.: US 6,871,872 B2
(45) Date of Patent: Mar. 29, 2005

(54) AIR BAG MODULE DIFFUSER

(75) Inventor: David E. Thomas, North Branch, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 45 days.

(21) Appl. No.: 10/434,175

(22) Filed: May 9, 2003

(65) Prior Publication Data
US 2004/0222621 A1 Nov. 11, 2004

(51) Int. Cl.$^7$ ................................................ B60R 21/26
(52) U.S. Cl. ...................... 280/736; 280/740; 280/742
(58) Field of Search ................................. 280/732, 736, 280/740, 742, 728.2

(56) References Cited

U.S. PATENT DOCUMENTS 3,602,526 A * 8/1971 Brawn ........................ 280/740
5,752,715 A * 5/1998 Pripps et al. ................ 280/740
5,806,879 A * 9/1998 Hamada et al. ........... 280/728.2
5,848,803 A * 12/1998 Tonooka et al. ............ 280/740
5,918,898 A * 7/1999 Wallner et al. ........... 280/728.2
6,149,192 A * 11/2000 Swann et al. ............... 280/740
6,183,007 B1 * 2/2001 Steffens et al. ............. 280/736
6,340,174 B1 * 1/2002 Takagi et al. ............... 280/736

* cited by examiner

Primary Examiner—Paul N. Dickson
Assistant Examiner—Toan C To
(74) Attorney, Agent, or Firm—Lonnie Drayer

(57) ABSTRACT

An air bag module comprises an air bag having an interior cavity. The air bag has an air bag opening in communication with the interior cavity. The air bag module has an air bag inflator with an outlet for inflating the air bag. At least one vane extends from the air bag opening into the interior cavity of the air bag.

15 Claims, 3 Drawing Sheets

AIR BAG MODULE DIFFUSER

BACKGROUND OF THE INVENTION

This invention relates to a passenger side air bag module.

An air bag module typically comprises an air bag and an air bag inflator. When a severe crash is detected by a vehicle's crash detection system, the system may instruct the air bag module to deploy. If this event occurs, the air bag inflator rapidly discharges an inflation gas at a very high temperature into the air bag. The high temperature of the gas causes its rapid expansion, thereby inflating the air bag to form a cushion against vehicle impact for a vehicle occupant. Preferably, the air bag should deploy towards the vehicle occupant to maximize cushioning. However, challenges arise in the design of an air bag module for a passenger side air bag. Specifically, due to the shape of passenger side air bag inflators, inflation gas from the air bag inflator may discharge toward the side of the vehicle occupant. As a consequence, the air bag may deploy toward the side of the vehicle occupant rather than in the direction of the occupant.

Manufacturers have sought to overcome this design challenge by using a vent to redistribute the flow of inflation gas across the mouth of the air bag through guide structures, such as holes or vanes, located between the air bag inflator and the air bag. Vent holes are not very effective in redistributing air flow. Moreover, the vanes that manufacturers currently use extend between the air bag inflator and the air bag and are located outside of the air bag. Applicant has discovered that these vanes draw heat away from the inflation gas and consequently reduce its ability to expand the air bag.

A need therefore exists for an air bag module that redirects the flow of inflation gas towards the vehicle occupant without significant heat loss.

SUMMARY OF THE INVENTION

The present invention comprises an air bag module, having an air bag and air bag inflator. The air bag has an interior cavity and an air bag opening leading into the interior cavity. In the event of air bag deployment, the air bag inflator discharges an inflation gas out of an outlet generally to the side of the vehicle occupant. A vane then redirects the flow of inflation gas so that the air bag may deploy toward the vehicle occupant. In contrast to existing air bag modules, however, the vane of the inventive air bag module extends from the air bag opening into the interior cavity of the air bag. In this way, the vane is located completely within the insulating confines of the air bag. This unique location for the vane reduces heat loss significantly. Accordingly, the vane allows the inflation gas to maintain its high temperature within the air bag while still redirecting the air bag towards the vehicle occupant.

The vane is located near the air bag opening. Moreover, to further reduce temperature loss, the vane is sized smaller than the air bag opening. The vane may have a dimension, such as a width, less than a dimension of the air bag opening, such as an opening width. By reducing the size of the vane relative to the air bag opening, the high temperature of the inflation gas is further maintained.

A support may be used to hold the vanes in place relative to the air bag. The support may comprise a number of vanes each spaced next to an air bag opening. To reduce heat loss, the air bag may be attached around the support. The support may be rectangular in shape. In addition, pressure relief holes may be provided in the support to adjust the distribution of inflation gas across the air bag opening.

The invention further encompasses an inventive manufacturing technique. A vane is placed next to an air bag opening on a support. Rather than placing the vane outside of the air bag, the vane is extended into the air bag. The air bag is then attached around the support. This technique thus permits inflation gas to be directed toward the vehicle occupant without a significant loss of heat.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
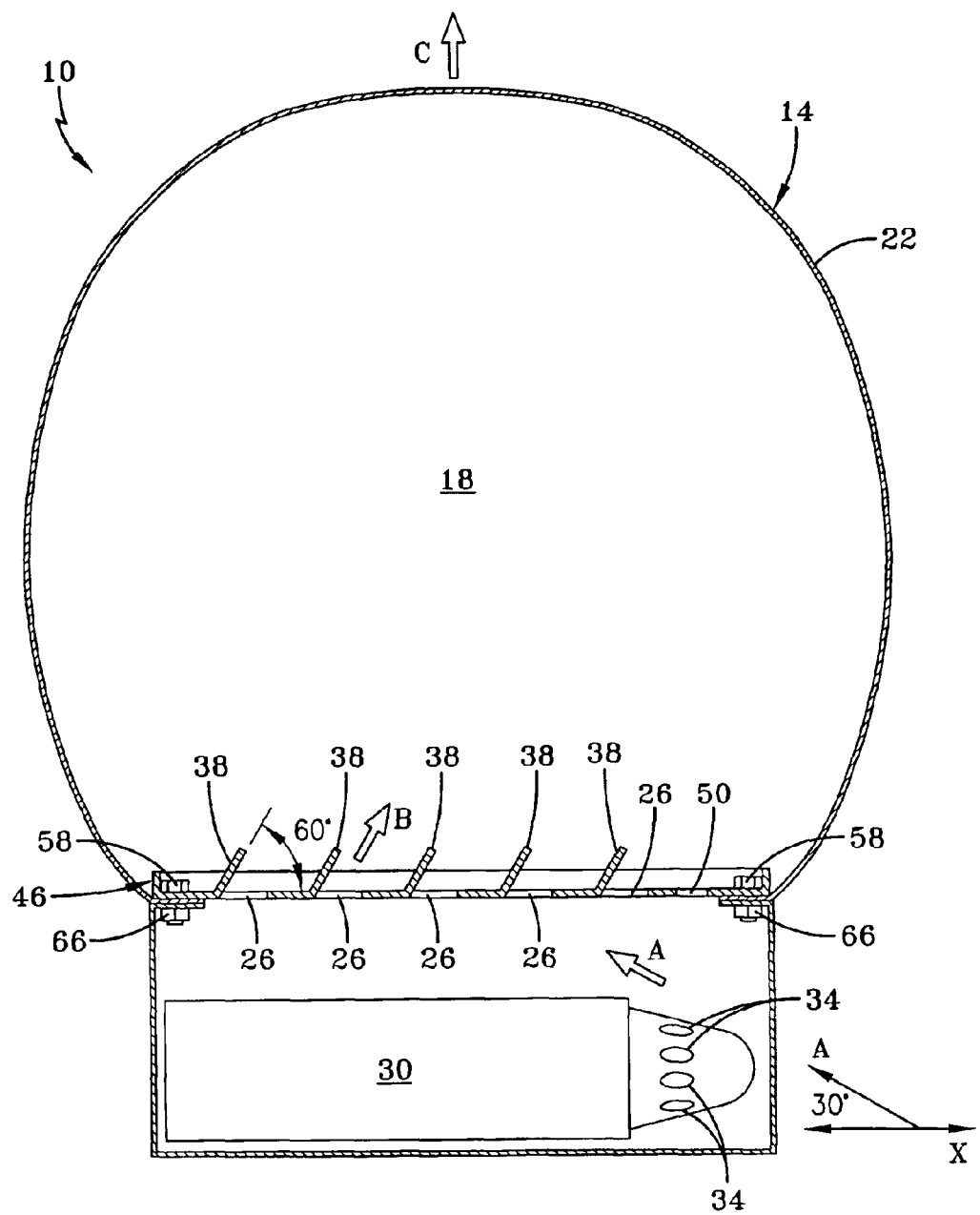
FIG. 1 illustrates a cross-sectional view of the inventive air bag module, including air bag, air bag inflator, and vanes extending from the air bag opening into the interior cavity.

FIG. 1 illustrates inventive air bag module 10 comprising air bag 14 and air bag inflator 30. Like existing air bag modules, air bag 14 has an exterior surface 22 that defines an interior cavity 18. Moreover, air bag inflator 30 has outlets 34, which, during deployment, direct inflation gas along the direction of path A. Path A may be at a 30° angle to an axis of inflator 30, axis X. Without guide structures, air bag 18 would tend to deploy generally along the direction of path A.

To address this issue, air bag module 10 has support 46 to redirect the flow of inflation gas from air bag inflator 30. Air bag support 46 has air bag openings 26 that permit the passage of inflation gas into interior cavity 18 from outlets 34 of air bag inflator 30. In addition, support 46 has vanes 38 that extend at an angle relative to support 46 as shown. The disclosed angle is approximately 60° or a 120° angle relative to axis X. As further shown in FIG. 1, each vane 38 is located adjacent each air bag opening 26. As a consequence of the location of vanes 38 relative to air bag openings 26, inflation gas passes through air bag openings 26 along vanes 38 in the direction of path B, a path transverse to path A. The net effect is to cause air bag 14 to expand in the direction of path C towards a vehicle occupant. Because vanes 38 completely or entirely extend from air bag openings 26 into interior cavity 18 as illustrated, heat loss is significantly minimized. Air bag 14 and hot inflation gas within air bag 14 insulates vanes 38 and allows the inflation gas to maintain its high temperature to optimally expand air bag 14.

Figure 2:
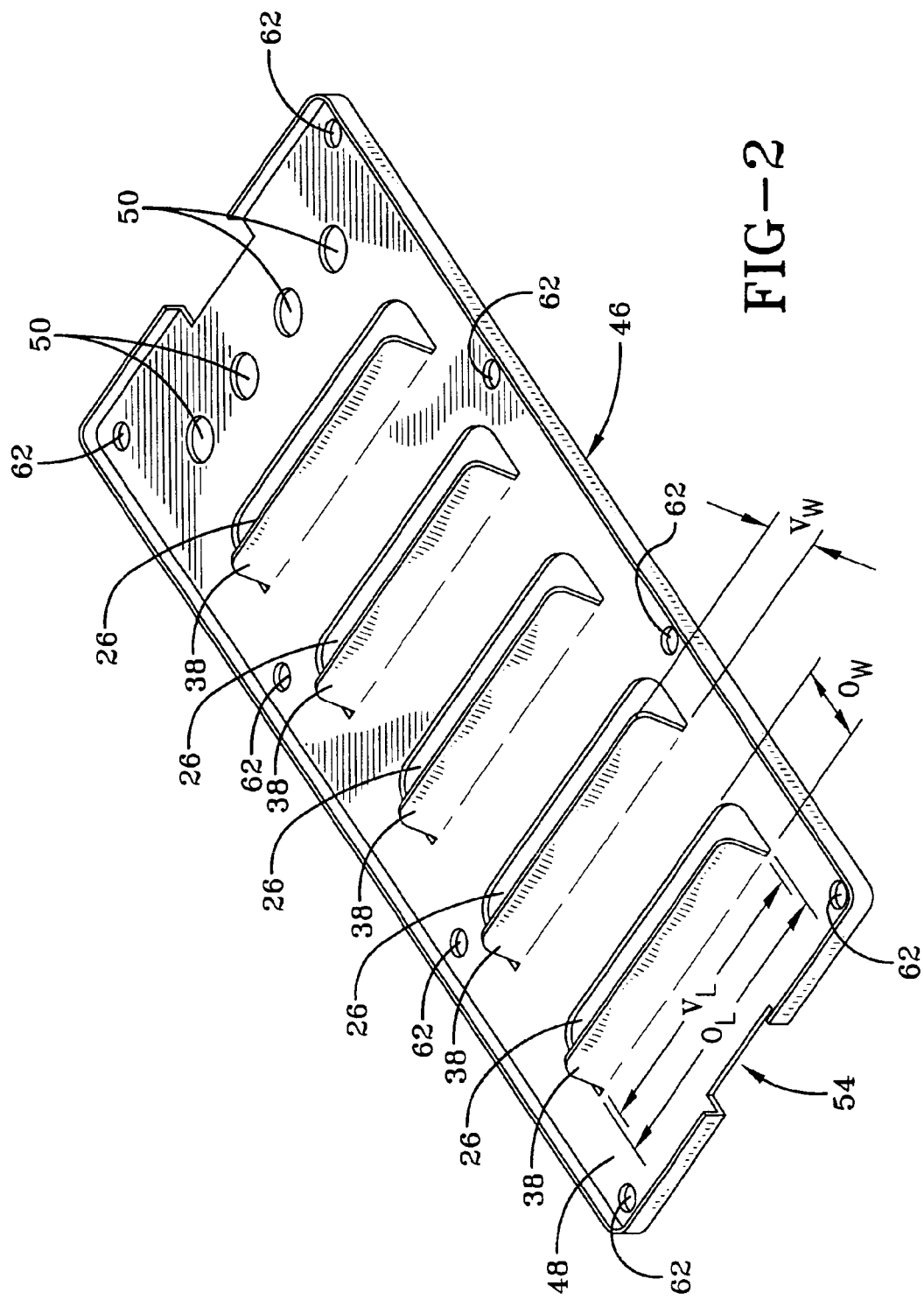
FIG. 2 illustrates a perspective view of the vanes of FIG. 1.

In further contrast to existing air bag modules, the inventive air bag module 10 has vanes 38 sized smaller than air bag openings 26. As shown in FIG. 2, support 46 comprises planar member 48 having air bag openings 26 located adjacent to vanes 38. Vanes 38 have width $V_w$ while air bag openings have air bag opening width $O_w$. Here, $V_w$ is preferably less than $O_w$. Also, the length of vanes $V_L$ is preferably less than the length of openings $O_L$. In this way, heat loss through vanes 38 is further minimized by keeping vanes 38 smaller than air bag openings 26.

In addition, support 46 has pressure relief holes 50. As shown in FIG. 1, pressure relief holes 50 are located between outlets 34 and air bag interior 18. Although not effective in redirecting inflation gas flow, pressure relief holes serve to improve the distribution of inflation gas around outlets 34. The size and location of pressure relief valves will vary with the pressure from air bag inflator 30 and the location of outlets 34.

Figure 3:
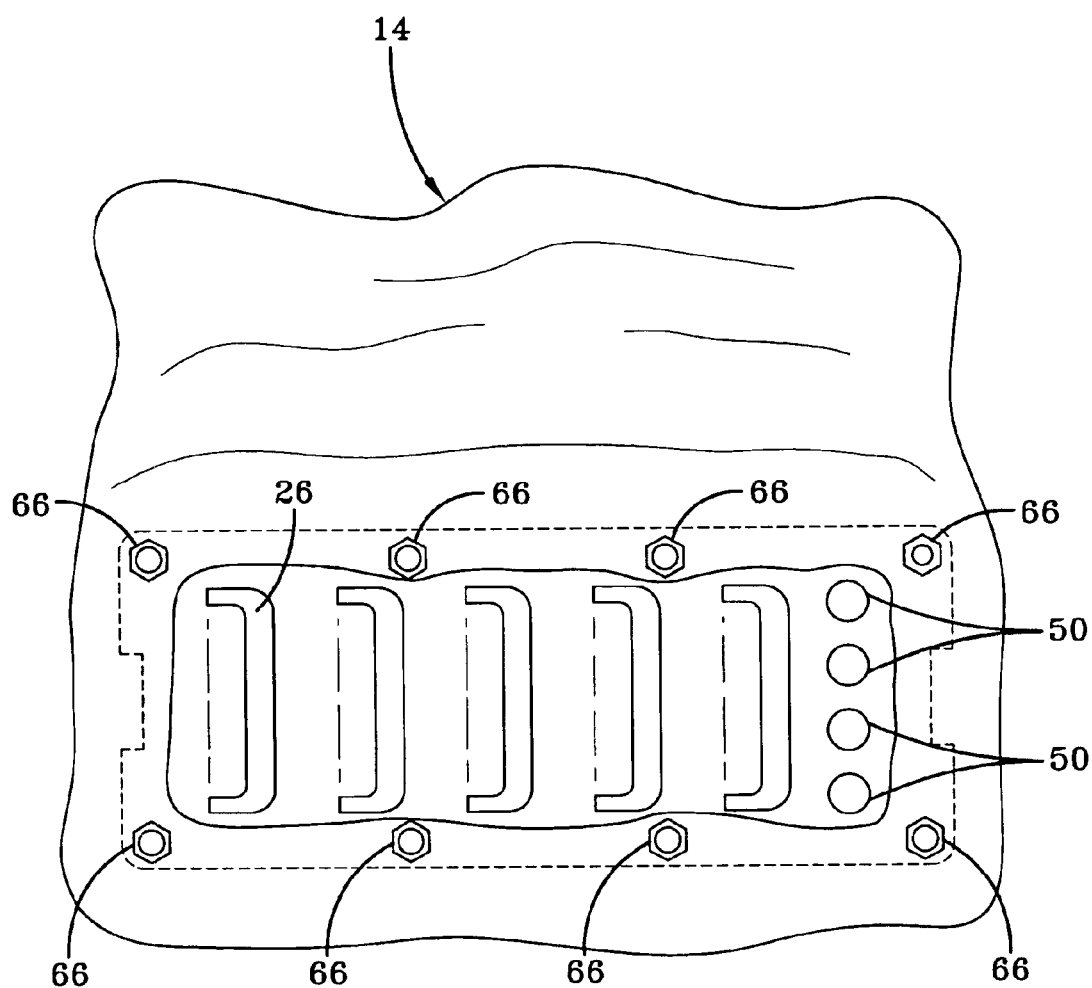
FIG. 3 illustrates a bottom view of the inventive air bag module of FIG. 1.

In addition, support 46 has bolt holes 62 that receive bolts 58. As shown in FIG. 1 and FIG. 3, air bag 14 is attached to support 46 by a bolt 58 and nut 66 connection. It should be noted that air bag 14 surrounds support 46 to prevent the leakage of inflation gas around support 46 as well as to maintain the high temperature of inflation gas within interior cavity 18 of air bag 14.

Thus, air bag module 10 is made by placing vanes 38 adjacent to air bag openings 26. Vanes 38 completely are extended into interior cavity 18 of air bag 14. Air bag 14 is then attached around support 46. Support 46 preferably comprises a metal to withstand the high temperature of the inflation gas. Support 46 may be produced by stamping, such as by a progressive die. Notch 54 may be provided to assist the movement of support 46 within the progressive die.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. An air bag module, comprising:
    an air bag having an interior cavity;
    an air bag support, the air bag support having at least one air bag opening in communication with said interior cavity and at least one vane extending from the air bag support and being adjacent to an air bag opening and completely extending into said interior cavity;
    an air bag inflator having an outlet for inflating said air bag; and
    wherein said outlet is disposed to direct an inflation gas along a first direction and said at least one vane is disposed internal said interior cavity to direct the inflation gas along a second direction transverse to said first direction in the internal cavity of the air bag.

2. The air bag module of claim 1 wherein said at least one vane has a vane dimension smaller than an opening dimension of said at least one air bag opening.

3. The air bag module of claim 2 wherein said vane dimension comprises a vane width and said opening dimension comprises an opening width, said vane width smaller than said opening width.

4. The air bag module of claim 1 wherein said at least one vane comprise a plurality of vanes end said at least one air bag opening comprises a plurality of air bag openings, each of said plurality of vanes adjacent to each of said plurality of air bag openings.

5. The air bag module of claim 4 wherein the including a support has a plurality of vanes and a plurality of air bag openings, each vane being adjacent one of the air bag openings.

6. The air bag module of claim 5 wherein said support is attached to said air bag.

7. The air bag module of claim 5 wherein said support comprises a planar member.

8. The air bag module of claim 5 including at least one pressure relief hole on said support spaced between said outlet and said interior cavity, said at least one pressure relief hole in communication with said interior cavity.

9. An air bag module, comprising:
    an air bag having an interior cavity;
    an air bag support having a plurality of air bag openings in communication with said interior cavity and a plurality of vanes extending completely into said interior cavity, each vane being adjacent to one air bag opening;
    an air bag inflator having an outlet for inflating said air bag, said outlet disposed to direct an inflation gas along a first direction; and
    wherein said plurality of vanes are disposed internal said interior cavity to re-direct the inflation gas along a second direction transverse to said first direction.

10. The air bag module of claim 9 wherein said at least one vane has a vane dimension and said at least one air bag has an opening dimension, said vane dimension smaller than said opening dimension.

11. The air bag module of claim 10 wherein said vane dimension comprises a vane width and said opening dimension comprises an opening width, said vane width smaller than said opening width.

12. The air bag module of claim 9 wherein said support is attached to said air bag.

13. The air bag module of claim 9 wherein said support comprises a planar member.

14. The air bag module of claim 9 including at least one pressure relief hole on said support spaced between said outlet and said interior cavity, said at feast one pressure relief hole in communication with said support.

15. A method of manufacturing an air bag, comprising the steps of:
    placing a vane adjacent to an air bag opening on a support, wherein the air bag opening has an opening dimension and the vane has a vane dimension wherein the vane dimension is smaller than the opening dimension;
    extending the entire vane into an interior cavity of an air bag; and
    attaching the air bag around the support.

* * * * *